US011864143B2

(12) United States Patent
Lai et al.

(10) Patent No.: US 11,864,143 B2
(45) Date of Patent: Jan. 2, 2024

(54) METHOD FOR ADJUSTING TARGET CLOCK AND WIRELESS DEVICE THEREOF

(71) Applicant: REALTEK SEMICONDUCTOR CORP., Hsinchu (TW)

(72) Inventors: Te-Lun Lai, Hsinchu (TW); Chih-Ming Yen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 91 days.

(21) Appl. No.: 17/035,319

(22) Filed: Sep. 28, 2020

(65) Prior Publication Data
US 2021/0105733 A1  Apr. 8, 2021

(30) Foreign Application Priority Data

Oct. 2, 2019  (TW) ................................. 108135768

(51) Int. Cl.
*H04W 56/00* (2009.01)
(52) U.S. Cl.
CPC ... *H04W 56/0045* (2013.01); *H04W 56/0035* (2013.01)
(58) Field of Classification Search
CPC ....................... H04W 56/0035; H04W 56/0045
See application file for complete search history.

(56) References Cited

U.S. PATENT DOCUMENTS

| | | | | |
|---|---|---|---|---|
| 5,048,009 A | * | 9/1991 | Conrad | H04L 43/50 370/252 |
| 6,548,997 B1 | * | 4/2003 | Bronfer | G04F 10/04 713/400 |
| 6,629,256 B1 | * | 9/2003 | Ilan | H03L 7/00 713/503 |
| 9,572,102 B2 | * | 2/2017 | Hiremath | H04W 52/028 |
| 9,641,269 B2 | * | 5/2017 | Yamamoto | H04J 3/0697 |
| 2002/0041570 A1 | * | 4/2002 | Ptasinski | H04L 1/1848 370/252 |
| 2007/0242634 A1 | * | 10/2007 | Calcev | H04W 52/0225 370/318 |
| 2008/0152046 A1 | | 6/2008 | Armstrong et al. | |
| 2010/0329232 A1 | * | 12/2010 | Tubb | E05B 67/22 370/345 |

(Continued)

FOREIGN PATENT DOCUMENTS

| | | |
|---|---|---|
| CN | 101489290 A | 7/2009 |
| CN | 102118849 A | 7/2011 |
| TW | 200822566 A | 5/2008 |

*Primary Examiner* — Wutchung Chu
*Assistant Examiner* — Berhanu D Belete
(74) *Attorney, Agent, or Firm* — Birch, Stewart, Kolasch & Birch, LLP

(57) ABSTRACT

A method for adjusting a target clock of a wireless device and a wireless device thereof are provided. The method includes receiving two consecutive broadcast packets from a transmitter to obtain time information corresponding to each of the two broadcast packets; obtaining a time interval between the two broadcast packets according to the time information; and adjusting the target clock of the wireless device according to the time interval and a target value, to achieve the effect of automatically adjusting the target clock, the target clock being related to waking of the wireless device from a standby mode.

14 Claims, 2 Drawing Sheets

(56) References Cited

U.S. PATENT DOCUMENTS

| | | | |
|---|---|---|---|
| 2011/0214030 A1* | 9/2011 | Greenberg | A61B 5/7257 714/748 |
| 2011/0306315 A1* | 12/2011 | Subrahmanya | H04L 27/2278 455/226.1 |
| 2012/0127977 A1* | 5/2012 | Copeland | H04L 45/308 370/347 |
| 2012/0244881 A1* | 9/2012 | Konishi | G01S 5/0252 455/456.1 |
| 2013/0272180 A1* | 10/2013 | Hiremath | H04W 56/0035 370/311 |
| 2014/0051485 A1* | 2/2014 | Wang | H04W 72/52 455/574 |
| 2014/0112225 A1* | 4/2014 | Jafarian | H04W 52/0235 370/311 |
| 2014/0122958 A1* | 5/2014 | Greenebrg | A61B 5/6831 714/748 |
| 2014/0226647 A1* | 8/2014 | Das | H04W 52/0229 370/350 |
| 2014/0254466 A1* | 9/2014 | Wurster | H04L 51/18 370/312 |
| 2015/0016233 A1* | 1/2015 | Gu | H04M 1/725 368/251 |
| 2015/0103818 A1* | 4/2015 | Kuhn | H04W 56/00 370/350 |
| 2015/0296453 A1* | 10/2015 | Hiremath | H04W 52/028 370/311 |
| 2016/0112974 A1* | 4/2016 | Shenoi | H04J 3/065 370/350 |
| 2017/0208558 A1* | 7/2017 | Gao | H04W 56/0015 |
| 2017/0238274 A1* | 8/2017 | Zhang | H04W 88/02 455/456.1 |
| 2018/0139709 A1* | 5/2018 | Shenoi | H04J 3/065 |
| 2018/0324102 A1* | 11/2018 | Takahashi | H04L 47/32 |
| 2019/0044774 A1* | 2/2019 | Crols | H03L 7/06 |
| 2021/0099329 A1* | 4/2021 | Hellfajer | H04L 27/2657 |

* cited by examiner

METHOD FOR ADJUSTING TARGET CLOCK AND WIRELESS DEVICE THEREOF

CROSS-REFERENCE TO RELATED APPLICATION

This non-provisional application claims priority under 35 U.S.C. § 119(a) to Patent Application No. 108135768 in Taiwan, R.O.C. on Oct. 2, 2019, the entire contents of which are hereby incorporated by reference.

BACKGROUND

Technical Field

This application relates to a method for adjusting a target clock and a wireless device thereof, and in particular, to a method for adjusting a target clock by using packet information and a wireless device thereof.

Related Art

With the development of wireless communications technologies, wireless communications services such as Bluetooth, WiFi, and worldwide interoperability for microwave access (WiMAX) are widely applied. When a wireless device is in a wireless network, a base station or an access point (AP) may periodically send a beacon signal to determine an online state of the surrounding wireless device.

However, if the wireless device is in a standby state and the time at which the wireless device wakes up to receive packets is inaccurate, the average electrical current or power consumption may be excessively large, which reduces battery life of the entire system of the wireless device. Generally, there are two primary causes for the excessively long time for receiving the packets. One is that different system internal parameters related to semiconductor process of the wireless device may cause inconsistent or undesirable frequencies, and the other is that a transmission frequency of the base station or the access point may also vary due to the different internal parameters, which changes or affects the time at which the packet is sent.

SUMMARY

As described above, because the time at which a wireless device in a wireless network receives packets is inaccurate, the wireless device is faced with a problem of an excessively long time for receiving the packets.

In view of this, a method for adjusting a target clock of a wireless device is provided. The wireless device is configured to receive broadcast packets sent by a transmitter. The method includes: receiving two consecutive broadcast packets to obtain time information corresponding to each of the two broadcast packets; obtaining a time interval between the two broadcast packets according to the time information; and adjusting the target clock of the wireless device according to the time interval and a target value, the target clock being related to waking of the wireless device from a standby mode.

This application further provides a wireless device, having a target clock and receiving broadcast packets sent by a transmitter. The wireless device includes a wireless transceiver circuit and a processor. The wireless transceiver circuit sequentially receives two consecutive broadcast packets, and the processor is electrically coupled to the wireless transceiver circuit and configured to obtain time information corresponding to each broadcast packet. The processor obtains a time interval between the two broadcast packets according to the time information, and adjusts the target clock according to the time interval and a target value, wherein the wireless transceiver circuit wakes according to the target clock.

In an embodiment, the time information is the time at which the transmitter sends the broadcast packet or the time at which the wireless transceiver circuit receives the broadcast packet.

In an embodiment, a frequency error is first obtained according to the time interval and the target value, and the target clock is adjusted according to a product of the frequency error and a preset frequency of the wireless device.

In an embodiment, when the time interval is greater than or equal to a target value ($PKT_{target}$), the frequency error is calculated according to $$Err = \frac{P_n - P_{n-1}}{PKT_{target}} - 1,$$

and a frequency value of the target clock is decreased according to the frequency error; and when the time interval is less than the target value, the frequency error is calculated according to $$Err = 1 - \frac{P_n - P_{n-1}}{PKT_{target}},$$

and the frequency value of the target clock is increased according to the frequency error. Err represents the frequency error, $P_n - P_{n-1}$ represents the time interval, and $PKT_{target}$ represents the target value.

In an embodiment, a sigma-delta modulation unit adjusts the target clock according to a product of the frequency error and a preset frequency.

In conclusion, in this application, the value of the target clock is adjusted by using the time interval between the two broadcast packets, to achieve a purpose of automatically adjusting the target clock of the wireless device.

DETAILED DESCRIPTION

Figure 1:
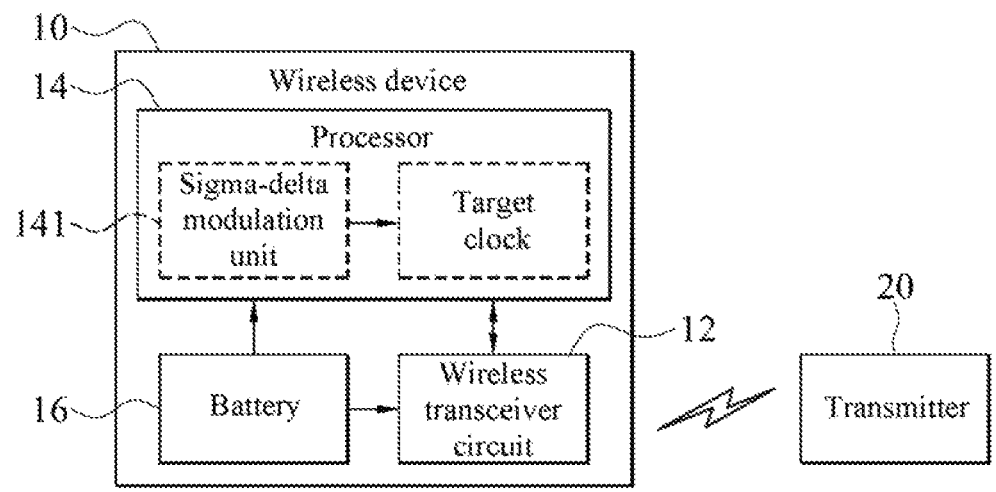
FIG. 1 is a schematic block diagram of a wireless device according to an embodiment of this application.

FIG. 1 is a schematic block diagram of a wireless device according to an embodiment of this application. Referring to FIG. 1, the wireless device 10 includes a wireless transceiver circuit 12, a processor 14, and a battery 16. The wireless transceiver circuit 12 is electrically connected to the processor 14, and the battery 16 is electrically connected to the wireless transceiver circuit 12 and the processor 14, to provide power required by operating of elements. In an embodiment, the wireless device 10 and a transmitter 20 are in a same wireless network, which may be, for example, but is not limited to, Bluetooth, WiFi, or worldwide interoperability for microwave access (WiMAX). The wireless transceiver circuit 12 is configured to receive broadcast packets sent by the transmitter 20, and send the received broadcast packets to the processor 14. The processor 14 may perform calculation processing according to packet information of the broadcast packets to adjust a target clock.

Figure 2:
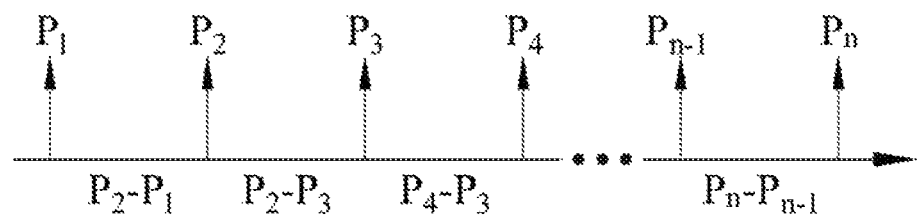
FIG. 2 shows a state in which a transmitter sends a broadcast packet according to an embodiment of this application.

A state in which the transmitter 20 sends the broadcast packets may be seen in FIG. 2. The transmitter 20 may periodically send a broadcast packet according to a time period. A first broadcast packet is sent at a $P_1$ time point, a second broadcast packet is sent at a $P_2$ time point, and a third broadcast packet is sent at a $P_3$ time point. In the same way, an $(n-1)^{th}$ broadcast packet is sent at a $P_{n-1}$ time point, and an $n^{th}$ broadcast packet is sent at a $P_n$ time point. To receive the broadcast packets, the wireless device 10 in a same wireless network as the transmitter 20 may periodically wake up according to the target clock, and the target clock of the wireless device 10 needs to match the time period to receive the broadcast packets. However, even if the time period of the transmitter 20 is equal to the target clock of the wireless device 10, a frequency of the wireless device 10 may be inconsistent with a frequency of the transmitter 20 due to a change of a time point at which the transmitter 20 sends a packet or different system internal parameters of the wireless device 10 and the transmitter 20. As a result, the time at which the wireless device 10 wakes up according to the target clock is inaccurate, and the wireless device 10 cannot just match the time at which the transmitter 20 sends the broadcast packet. In this way, the target clock of the wireless device 10 needs to be adjusted to automatically synchronize with the time at which the transmitter 20 sends the broadcast packet.

In an embodiment, the transmitter 20 may be a base station or an access point (AP), and the wireless device 10 is a wireless camera. The base station or the AP may periodically send a broadcast packet to confirm an online state of the wireless camera, and the wireless camera in a standby state may periodically wake up to receive the broadcast packet.

Figure 3:
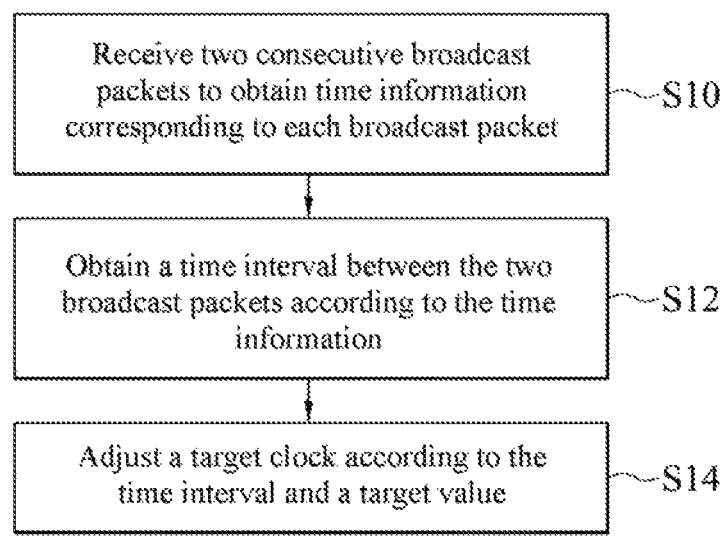
FIG. 3 is a flowchart of a method for adjusting a target clock according to an embodiment of this application.

FIG. 3 is a flowchart of a method for adjusting a target clock according to an embodiment of this application. With reference to FIG. 1, FIG. 2, and FIG. 3, the transmitter 20 can periodically send a broadcast packet according to a time period. As shown in step S10, when starting to adjust the target clock, the wireless device 10 sequentially receives two consecutive broadcast packets through the wireless transceiver circuit 12, and the processor 14 obtains time information corresponding to each broadcast packet according to the received broadcast packet. The time information is the time at which the transmitter 20 sends the broadcast packet. In another embodiment, the time information may also be the time at which the wireless transceiver circuit 12 receives the broadcast packet.

As shown in step S12, after obtaining the time information about the two consecutive broadcast packets, the processor 14 may obtain a time interval between the two broadcast packets according to a time difference between the two pieces of time information. For example, two pieces of time information of an $(n-1)^{th}$ broadcast packet sent at a $P_{n-1}$ time point and an $n^{th}$ broadcast packet sent at a $P_n$ time point are respectively $P_{n-1}$ and $P_n$, and a time interval between the two broadcast packets is represented as $P_n-P_{n-1}$.

As shown in step S14, the processor 14 adjusts the target clock according to the time interval and a target value. Specifically, the processor 14 first obtains a frequency error according to the time interval and the target value, and decreases or increases the target clock according to a product of the frequency error and a preset frequency of the wireless device 10.

In an embodiment, when the time interval is greater than or equal to the target value ($PKT_{target}$), the processor 14 may calculate the frequency error according to a first relation $$Err = \frac{P_n - P_{n-1}}{PKT_{target}} - 1$$

of the time interval and the target value, and then decrease a frequency value of the target clock according to a product of the frequency error and a preset frequency, thereby the processor 14 adjusts a time value of the target clock according to the frequency value. Err represents the frequency error, $P_n-P_{n-1}$ represents the time interval, and $PKT_{target}$ represents the target value (the target value of a packet time difference). When the time interval is less than the target value, the processor 14 may calculate the frequency error according to a second relation $$Err = 1 - \frac{P_n - P_{n-1}}{PKT_{target}}$$

of the time interval and the target value, and increase the frequency value of the target clock according to the product of the frequency error and the preset frequency, thereby the processor 14 adjusts the time value of the target clock according to the frequency value. In this way, the target clock of the wireless device 10 may be effectively adjusted according to the actually received broadcast packet, so that the wireless device 10 can receive the broadcast packet sent by the transmitter 20 more accurately.

In an embodiment, the processor 14 multiples the preset frequency by the frequency error by using a sigma-delta modulation (SDM) unit 141 built inside the processor 14, and adjusts the value of the target clock according to the product.

During the process that the processor 14 adjusts the target clock, the foregoing step S14 may further be represented by the following two equations: when the time interval ($P_n-P_{n-1}$) is greater than or equal to the target value ($PKT_{target}$), the processor 14 may select the following equation 1 to perform calculation; and when the time interval ($P_n-P_{n-1}$) is less than the target value ($PKT_{target}$), the processor 14 may select the following equation 2 to perform calculation.

$$\text{when } P_n - P_{n-1} \geq PKT_{target} \quad \text{Equation 1}$$
$$Err = \frac{P_n - P_{n-1}}{PKT_{target}} - 1 \rightarrow SDM(\text{decreased frequency}, N*Err)$$

$$\text{when } P_n - P_{n-1} < PKT_{target} \quad \text{Equation 2}$$
$$Err = 1 - \frac{P_n - P_{n-1}}{PKT_{target}} \rightarrow SDM(\text{increased frequency}, N*Err)$$

In the foregoing two equations, Err represents the frequency error; $P_n-P_{n-1}$ represents the time interval; $PKT_{target}$ represents the target value; SDM represents a function of the sigma-delta modulation unit 141, and the sigma-delta modulation unit 141 performs calculation processing; and N represents the preset frequency of the wireless device 10.

In an embodiment, when the preset frequency of the wireless device 10 is 32 KHz, the target value is 100 ms.

For example, during an actual adjustment of the target clock, if the time information $P_{n-1}$ of a broadcast packet is 100 ms and the time information $P_n$ of a next broadcast packet is 220 ms, the time interval between the two broadcast packets is represented as 220−100=120 ms. When the preset frequency of the wireless device 10 is 32 KHz and the target value is 100 ms, the time interval, which is 120 ms, is greater than the target value, which is 100 ms. Therefore, the foregoing formula 1 is selected to perform calculation. In this case, the frequency error Err=(120/100)−1=0.2, which represents an output frequency is to be decreased by 32 K*0.2=6.4 K. Therefore, the target clock is finally to be increased by 0.15625 ms, causing the adjusted target clock to be 0.15625 ms more than the original target clock. If the time information $P_{n-1}$ of a broadcast packet is 100 ms and the time information $P_n$ of a next broadcast packet is 180 ms, the time interval between the two broadcast packets is represented as 180−100=80 ms. When the preset frequency of the wireless device 10 is 32 KHz and the target value is 100 ms, the time interval, which is 80 ms, is less than the target value, which is 100 ms. Therefore, the foregoing formula 2 is selected to perform calculation. In this case, the frequency error Err=1−(80/100)=0.2, which represents the output frequency is to be increased by 32 K*0.2=6.4 K. Therefore, the target clock is finally to be reduced by 0.15625 ms, causing the adjusted target clock to be 0.15625 ms less than the original target clock.

In an embodiment, the wireless device (the wireless transceiver circuit) is in a standby mode, and periodically wakes up to receive the broadcast packet according to the period of the target clock, thereby accurately adjusting the time at which the transmitter sends the broadcast packet corresponding to the target clock. Therefore, the wireless device may just wake up and receive the broadcast packet, to avoid reduction of service life of a battery caused by an excessively long waking time consuming excessive power of the battery.

In an embodiment, the wireless device may also be in any mode. The manner of this application may be used to adjust the target clock as long as the purpose is to make the time of any wireless device match the time of the transmitter. Therefore, the clock of the wireless device may synchronize with the clock of the transmitter more accurately.

In conclusion, to resolve an inaccurate problem of the clock, in this application, the value of the target clock is automatically adjusted by using the time interval between the two broadcast packets. Because the target clock of the wireless device is adjusted according to the actually received broadcast packet to synchronize with the time at which the transmitter sends the broadcast packet, the wireless device can receive the broadcast packet sent by the transmitter more accurately, to improve a problem of an excessively long time for receiving the broadcast packet and avoid an unnecessary consumption of the battery in the wireless device, thereby prolonging service life of the entire system (the wireless device). Therefore, in this application, the target clock is adjusted by using packet information, to achieve a purpose of automatically adjusting the target clock of the wireless device.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for adjusting a target clock of a wireless device, the wireless device receiving broadcast packets sent by a transmitter, the method comprising:
   receiving two consecutive broadcast packets to obtain time information corresponding to each of the two broadcast packets;
   obtaining a time interval between the two broadcast packets according to the time information; and
   adjusting the target clock according to the time interval and a target value, the target clock being related to waking of the wireless device from a standby mode, wherein
   in the step of adjusting the target clock according to the time interval and the target value, a frequency error is obtained according to the time interval and the target value, and the target clock is adjusted according to a product of the frequency error and a preset frequency of the wireless device.

2. The method for adjusting target clock according to claim 1, wherein the time information is the time at which the transmitter sends the broadcast packet.

3. The method for adjusting target clock according to claim 1, wherein the time information is the time at which the wireless device receives the broadcast packet.

4. The method for adjusting target clock according to claim 1, wherein when the time interval is greater than or equal to the target value, the frequency error is calculated according to $$Err = \frac{P_n - P_{n-1}}{PKT_{target}} - 1,$$

and a frequency value of the target clock is decreased according to the frequency error, wherein Err represents the frequency error, $P_n - P_{n-1}$ represents the time interval, and $PKT_{target}$ represents the target value.

5. The method for adjusting target clock according to claim 4, wherein when the time interval is less than the target value, the frequency error is calculated according to $$Err = 1 - \frac{P_n - P_{n-1}}{PKT_{target}},$$

and the frequency value of the target clock is increased according to the frequency error.

6. The method for adjusting target clock according to claim 1, wherein in the step of adjusting the target clock according to the time interval and the target value, the target clock is adjusted by using a sigma-delta modulation unit.

7. The method for adjusting target clock according to claim 1, wherein the wireless device is in the standby mode, and periodically wakes up to receive the broadcast packet according to the period of the target clock.

8. A wireless device, having a target clock and receiving broadcast packets sent by a transmitter, the wireless device comprising:
   a wireless transceiver circuit sequentially receiving two broadcast packets; and
   a processor electrically coupled to the wireless transceiver circuit and configured to obtain time information corresponding to each broadcast packet, the processor obtaining a time interval between the two broadcast packets according to the time information and adjusting the target clock according to the time interval and a target value, wherein the wireless transceiver circuit wakes according to the target clock, and the processor obtains a frequency error according to the time interval and the target value, and adjusts the target clock according to a product of the frequency error and a preset frequency of the wireless device.

9. The wireless device according to claim 8, wherein the time information is the time at which the transmitter sends the broadcast packet.

10. The wireless device according to claim 8, wherein the time information is the time at which the wireless transceiver circuit receives the broadcast packet.

11. The wireless device according to claim 8, wherein when the time interval is greater than or equal to the target value, the processor calculates the frequency error according to $Err=P_n-P_{n-1}/PKT_{target}-1$, and a frequency value of the target clock is decreased according to the frequency error, wherein Err represents the frequency error, $P_n-P_{n-1}$ represents the time interval, and $PKT_{target}$ represents the target value.

12. The wireless device according to claim 11, wherein when the time interval is less than the target value, the processor calculates the frequency error according to $Err=1-P_n-P_{n-1}/PKT_{target}$, and the frequency value of the target clock is increased according to the frequency error.

13. The wireless device according to claim 8, wherein the processor adjusts the target clock by using a sigma-delta modulation unit built inside the processor.

14. The wireless device according to claim 8, wherein the wireless transceiver circuit is in a standby mode, and periodically wakes up to receive the broadcast packet according to the period of the target clock.

* * * * *